United States Patent Office 3,175,623
Patented Mar. 30, 1965

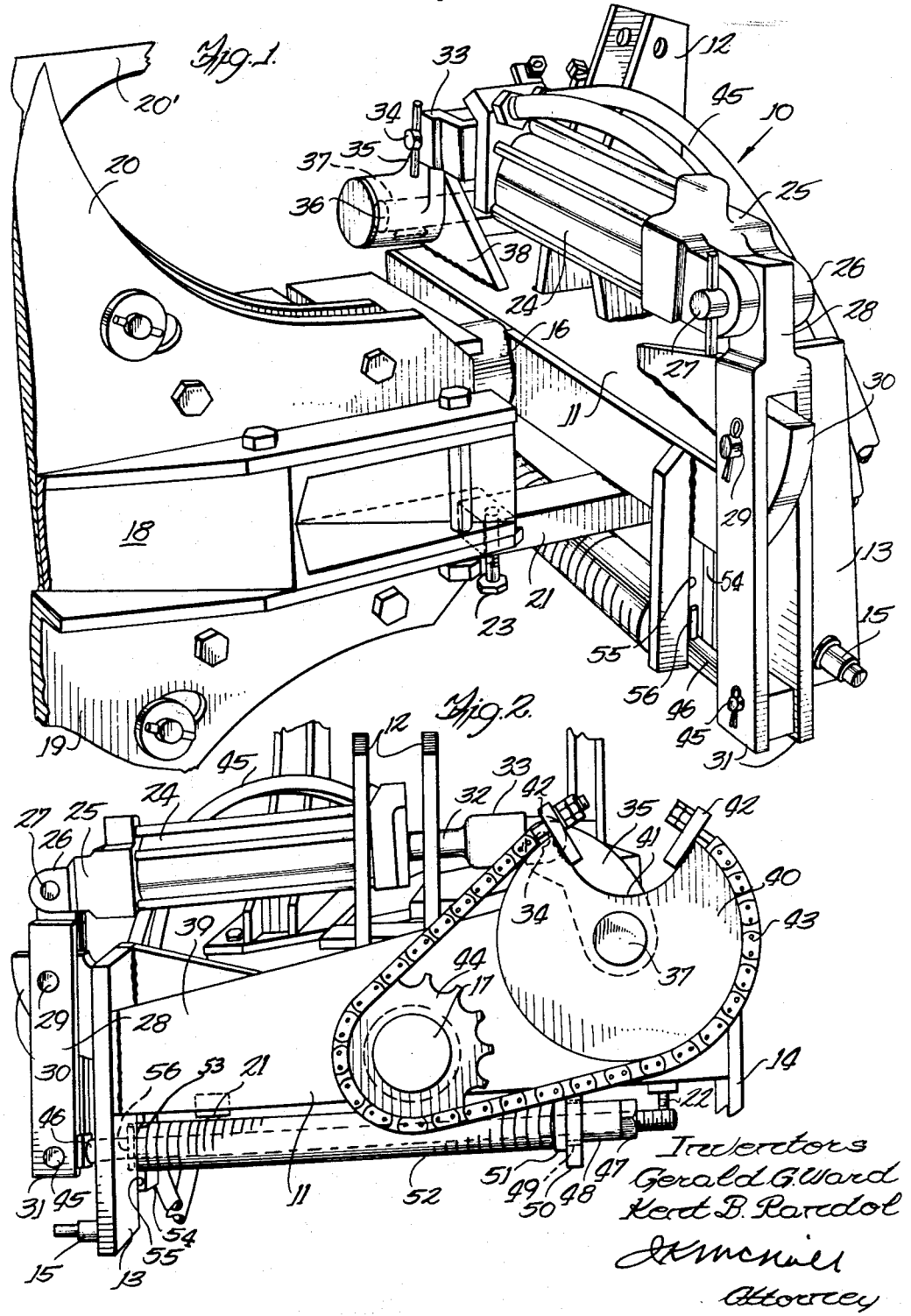

3,175,623
TWO-WAY PLOW WITH CUSHIONED
CYLINDER MOUNTING
Gerald G. Ward and Kent B. Randol, Naperville, Ill.,
assignors to International Harvester Company, Chicago, Ill., a corporation of New Jersey
Filed Apr. 1, 1963, Ser. No. 269,666
10 Claims. (Cl. 172—225)

This invention relates to agricultural implements and particularly to roll-over two-way plows. More specifically, the invention concerns novel shock-absorbing means for a two-way plow.

A two-way plow of the type with which this invention is concerned is reversible about a horizontal axis extending in the direction of travel and is preferably of the direct-connected type adapted to be mounted upon a tractor to be carried thereby in transport. Plows of this type are generally heavy and the power of the tractor is utilized through a hydraulic jack mounted on the stationary part of the plow frame and connected to the revolving plow carrier by means permitting reversing of the plow for right and left-hand plowing by the extension and retraction strokes of the jack.

Stops are usually provided on the stationary part of the plow frame to limit the rotation of the tool carrier, and it has been found that bouncing of the carrier upon engaging the stop is transmitted to the hydraulic jack causing frequent damage thereto. The shock of the operating plow units striking the ground when they are lowered is likewise transmitted to the jack as well as overrunning of the piston rod in the cylinder when the plow is reversed. Such damage to the jack and other plow parts is costly and repairs are time-consuming, and an object of this invention is the provision of an improved cylinder mounting for a two-way plow whereby the aforementioned disadvantages are avoided.

Another object of the invention is the provision of a novel shock absorbing device for use in a two-way plow to provide a cushioning action avoiding damage to the operating parts of the plow.

Another object of the invention is to provide in a two-way roll-over plow having a hydraulic jack for reversing the plow carrier, novel means for anchoring the jack to the frame accommodating lost motion and a cushioning action preventing damage to the cylinder and operating parts of the plow as the result of shocks when the plow units are reversed and lowered to operating position.

Other objects and advantages of the invention will become clear from the following detailed description when read in conjunction with the accompanying drawings wherein:

FIGURE 1 is a detail in perspective showing the front end of a two-way moldboard plow of the roll-over type embodying the features of this invention, and FIGURE 2 is a detail showing the plow of FIGURE 1 from the front.

In the drawings the numeral 10 designates the main or cross frame which comprises a generally rectangular beam 11 having affixed thereto a mast structure 12 for connection of the implement to the upper link of a tractor hitch structure of the three-point type. Depending plates 13 and 14 affixed to the ends of beam 11 carry laterally projecting pins 15, only one of which is shown, for connection of the implement to the lower links of the tractor hitch structure, not shown.

Also affixed to beam 11 centrally thereof and extending rearwardly horizontally therefrom is a pipe section 16 adapted to rotatably receive the forward end of a tubular member 17 forming part of a tool carrier 18 of any well known construction, forming no part of this invention, having mounted thereon at least one right-hand plow-carrying standard 19 and one left-hand plow-carrying standard 20, each carrying a plow bottom such as is indicated at 20' the carrier 18 and its tubular portion 17 being rotatable about the axis of the pipe 16 to alternately place the right and left-hand plow units in operation.

A pair of stops 21 and 22 are secured to and extend rearwardly from beam 11 on opposite sides of the pipe section 16 to engage the forward end of the tool carrier 18 in the alternate positions of the plows. For leveling purposes, the location at which the forward end of the tool carrier engages the stop bar 21 adjustable by the provision of a bolt 23 threaded into an opening in stop 21 and adjustable therein to engage the carrier.

Reversing of the tool carrier to place right and left-hand plow bottoms alternately in operation is accomplished by a hydraulic jack including a cylinder 24 having a head 25 bifurcated at 26 to receive a pivot pin 27 carried at the upper end of a lever 28 fulcrumed medially of its ends upon a pin 29 carried at the upwardly curved end of an extension 30 of beam 11 disposed between the spaced legs 31 of the lever, the function of which will hereinafter become clear.

A piston rod 32 slidable in cylinder 24 is bifurcated at 33 and connected to a pivot pin 34 carried at the upper end of an arm 35, having a cylindrical base 36 keyed to the rear end of a shaft 37 supported by an upright 38 affixed to the beam 11.

The forward end of shaft 37 is supported in a plate 39 affixed to beam 11 and has secured thereto a drive transmission wheel 40 having an arcuate portion 41 thereof removed to provide anchorage for a pair of circumferentially spaced lugs 42, to which are adjustably secured the respective ends of a drive chain 43 extending laterally inwardly therefrom and trained around a sprocket wheel 44 affixed to the tool carrier 17.

Fluid under pressure is supplied to the cylinder 24 through hose lines 45 from any well known source carried by the tractor, not shown, which propels the implement. Fluid supplied to the cylinder extends and retracts the piston rod 32 which acts through arm 35, wheel 40 and sprocket wheel 44 to turn the tool carrier 17 at each stroke of the piston through approximately 180° to alternately dispose right and left-hand plowing units in operation, the rotation of the tool carrier being limited by engagement with the adjustable bolt 23 carried by stop 21, one of which is provided at each side of the axis of the carrier 17.

As pointed out before, one of the major causes of damage to plows of this nature is the shock to the implement and the hydraulic system when reversing the plowing units or when lowering the implement to the ground. To overcome this hazard, the jack 24 is capable of lost motion in the direction of the piston stroke by virtue of the connection thereof to the upper end of lever 28.

The lower end of the lever is connected by a pivot pin 45 to the end of a rod 46 which extends laterally generally parallel to the cylinder 24.

The other end of rod 46 is threaded to receive an adjusting nut 47 engaging the end of a sleeve 48 slidable in an opening 49 in a lug 50 affixed to and extending from beam 11. A collar or shoulder 51 is formed on the end of sleeve 48 on the other side of lug 50 and is biased to engagement therewith by a compression spring 52 surrounding rod 46 and engaging at its other end a collar 53 abutting member 13, tension on the spring being adjustable by nut 47.

Member 13 includes a stop member 54 forming with member 13 a vertically extending slot 55 for the passage of rod 46.

Rod 46, sleeve 48 and spring 52 form a shock absorbing unit which acts in two directions, a shock to the hydraulic system acting through cylinder 24 to rock lever 28 in a clockwise direction as viewed in FIGURE 2, causing sleeve 48 and collar 51 to move to the left compressing spring 52 against the stop 13, 54 through the intermediary of collar 53.

A shock tending to rock lever 28 in counterclockwise direction as viewed in FIGURE 2 is transmitted to collar 53 and springs 52 by a pin 56 mounted in the end of rod 46 to be slidably received in slot 55 and to engage the collar 53 to compress the spring.

It is believed that the construction and operation of the novel cylinder mounting and shock absorbing device of this invention will be clearly understood from the foregoing description. It should likewise be understood that the invention has been described in its preferred embodiment and that modifications may be made therein without departing from the spirit of the invention or the scope of the appended claims.

What is claimed is:

1. In a two-way plow of the roll-over type wherein a relatively stationary cross-frame having hitch means thereon for connection to a tractor is provided with a rearwardly extending tool carrier for right and left-hand plows mounted on the cross-frame for rotation about a longitudinal axis with respect thereto to alternately dispose said plows in operating positions, the combination of a hydraulic jack mounted on the cross-frame generally parallel thereto, means operatively connecting one end of the jack to the tool carrier for revolving the latter by the actuation of the jack, and means connecting the other end of the jack to the cross-frame, stop means associated with the cross-frame engageable by the tool carrier in each of its operating positions to limit the rotation thereof relative to the cross-frame, the shock of the engagement of the tool carrier with said stop means being transmitted to said hydraulic jack axially thereof, and said means connecting said other end of the jack to the cross-frame including yieldable means yieldable to the axial movement of said jack adapted to absorb said shock to the jack.

2. The invention set forth in claim 1, wherein said yieldable means is a two-way spring device effective on both the extension and retracting strokes of the jack to absorb shock thereto.

3. The invention set forth in claim 2, wherein said means connecting said other end of the jack to the cross-frame includes a shiftable member mounted on the cross-frame and connected to said other end of the jack and to said spring device.

4. The invention set forth in claim 3, wherein said shiftable member is a lever pivoted medially of its ends on the cross-frame and having one end connected to said other end of the jack and having the other end connected to said spring device.

5. A shock absorber for a two-way roll-over plow of the type having a frame, a tool carrier having right and left-hand plow bottoms thereon rotatably mounted on the frame to be revolved about a longitudinal axis to alternately place said right and left-hand plow bottoms in operating positions and a hydraulic jack mounted on the frame, comprising a spring device mounted on the frame and including a coil spring and a part axially slidable relative thereto against the bias of the spring, means operatively connecting one end of the jack to said slidable part, means operatively connecting the other end of the jack to the tool carrier to rotate the latter, and stop means associated with said frame engageable by the tool carrier in each of its operating positions to limit the rotation thereof relative to the frame, the shock of the engagement of the tool carrier with said stop means being transmitted through said hydraulic jack axially thereof to said coil spring.

6. The invention set forth in claim 5, wherein the hydraulic jack is mounted on said frame parallel thereto and the spring device is mounted on the frame parallel to the hydraulic jack.

7. The invention set forth in claim 6, wherein the connection between the jack and the spring device includes a lever pivoted medially of its ends on the frame, the jack being connected to one end of the lever and the slidable part to the other.

8. The invention set forth in claim 7, wherein said frame includes a pair of spaced members having apertures therein adapted to slidably receive said slidable part and said spring surrounds said part and is confined between said spaced members.

9. The invention set forth in claim 8, wherein said slidable part has a stop secured thereto at each end thereof for engagement with opposite ends of said spring upon sliding of the part in opposite directions.

10. The invention set forth in claim 9, wherein the aperture in one of said spaced members slidably receives one of said stops.

References Cited by the Examiner

UNITED STATES PATENTS 2,625,090    1/53    Pursche _____ 172—328 X

FOREIGN PATENTS 460,243    11/50    Italy.

T. GRAHAM CRAVER, *Primary Examiner.*